United States Patent
Tokar et al.

(10) Patent No.: US 6,994,744 B2
(45) Date of Patent: *Feb. 7, 2006

(54) FILTER ARRANGEMENT AND METHODS

(75) Inventors: Joseph C. Tokar, Apple Valley, MN (US); James A. LeBlanc, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/896,818

(22) Filed: Jul. 22, 2004

(65) Prior Publication Data

US 2004/0255781 A1 Dec. 23, 2004

Related U.S. Application Data

(63) Continuation of application No. 10/382,250, filed on Mar. 5, 2003, now Pat. No. 6,960,245, which is a continuation of application No. 10/077,513, filed on Feb. 15, 2002, now Pat. No. 6,533,845, which is a continuation of application No. 09/437,867, filed on Nov. 10, 1999, now Pat. No. 6,348,085.

(51) Int. Cl.
*B01D 46/00* (2006.01)

(52) U.S. Cl. .............................. 95/273; 95/286; 95/287; 55/482; 55/486; 55/487; 55/488; 55/497; 55/498; 55/500; 55/502; 55/509; 55/511; 55/521

(58) Field of Classification Search ............... 55/385.1, 55/482, 483, 484, 486, 487, 488, 489, 490, 55/493, 495, 497, 498, 499, 500, 501, 502, 55/509, 511, 521, 524, DIG. 31; 95/273, 95/286, 287

See application file for complete search history.

(56) References Cited

U.S. PATENT DOCUMENTS

| | | | |
|---|---|---|---|
| 2,502,545 A | | 4/1950 | Wellborn |
| 2,599,604 A | * | 6/1952 | Bauer et al. ............. 210/494.1 |
| 3,076,554 A | | 2/1963 | Bub |

(Continued)

FOREIGN PATENT DOCUMENTS

GB  2 103 106 A  2/1983

(Continued)

OTHER PUBLICATIONS

"GDX™ Pulse Cleaning Filter System", *Donaldson Gas Turbine Systems* Brochure, 4 pgs. (1996).

*Primary Examiner*—Jason M. Greene
(74) *Attorney, Agent, or Firm*—Merchant & Gould P.C.

(57) ABSTRACT

A filter arrangement includes a first filter element having opposite first and second ends; an axial length between the first and second ends; and a plurality of flutes. Each of the flutes has a first end portion adjacent to the first filter element first end, and a second end portion adjacent to the first filter element second end. Selected ones of the flutes are open at the first end potion and closed at the second end portion; and selected ones of the flutes are closed at the first end portion and open at the second end portion. A sleeve member secured to and circumscribing the first filter element. The sleeve member is oriented relative the first filter element to extend at least 30% of the axial length of the first filter element. A seal member pressure flange at least partially circumscribes the sleeve member. The filter arrangement is particularly useful for gas turbine systems. Methods for operating and servicing filter arrangements preferably utilize constructions herein.

16 Claims, 8 Drawing Sheets

U.S. PATENT DOCUMENTS

| | | | |
|---|---|---|---|
| 4,065,341 A | 12/1977 | Cub | |
| 4,149,863 A | 4/1979 | Ballard | |
| 4,204,960 A | 5/1980 | Sugiyama et al. | |
| 4,443,237 A | 4/1984 | Ulvestad | |
| 4,652,285 A | 3/1987 | Greene | |
| 4,704,143 A * | 11/1987 | Percy | 55/502 |
| 4,758,460 A | 7/1988 | Spicer | |
| 4,767,427 A | 8/1988 | Barabas | |
| 4,769,096 A | 9/1988 | Vander Giessen et al. | |
| 4,969,999 A | 11/1990 | Riddell | |
| 5,137,696 A | 8/1992 | Hitachi et al. | |
| 5,229,078 A | 7/1993 | Haerle | |
| 5,266,195 A | 11/1993 | Hopkins | |
| 5,346,675 A | 9/1994 | Usui et al. | |
| 5,374,402 A | 12/1994 | Hitachi et al. | |
| 5,380,501 A * | 1/1995 | Hitachi et al. | 55/498 |
| 5,632,791 A | 5/1997 | Oussoren et al. | |
| 5,750,026 A | 5/1998 | Gadkaree et al. | |
| 5,772,883 A | 6/1998 | Rothman et al. | |
| D396,098 S | 7/1998 | Gillingham et al. | |
| 5,792,247 A | 8/1998 | Gillingham et al. | |
| 5,820,646 A | 10/1998 | Gillingham et al. | |
| 5,895,574 A | 4/1999 | Friedmann et al. | |
| 5,902,364 A | 5/1999 | Tokar et al. | |
| 5,961,696 A | 10/1999 | Gombos | |
| 6,348,085 B1 * | 2/2002 | Tokar et al. | 95/286 |
| 6,533,845 B2 * | 3/2003 | Tokar et al. | 95/273 |

FOREIGN PATENT DOCUMENTS

| | | |
|---|---|---|
| JP | 60-112320 | 6/1985 |
| JP | 1-11971 | 7/1989 |
| JP | 1-171615 | 7/1989 |

* cited by examiner

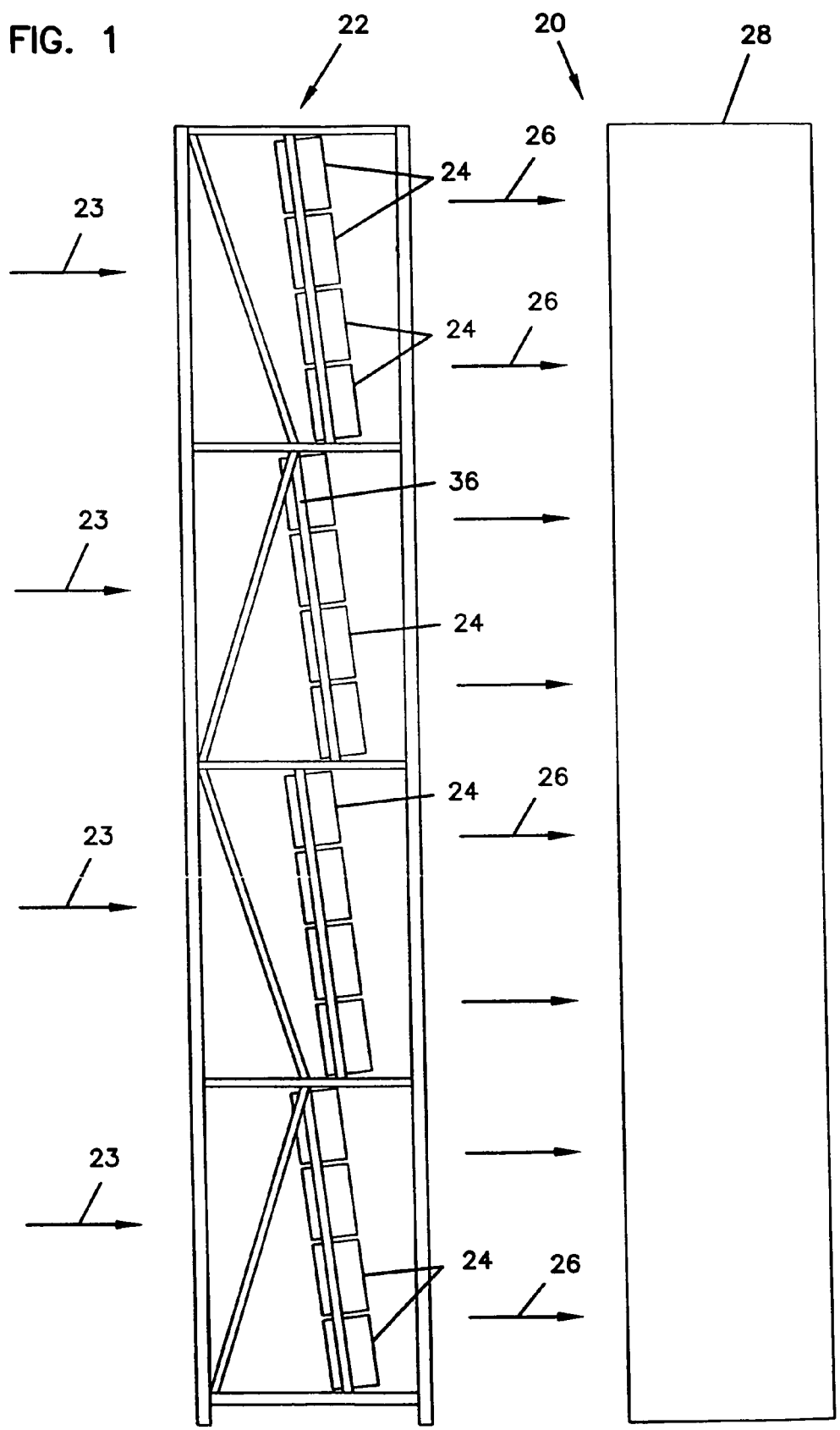

FILTER ARRANGEMENT AND METHODS

This application is a continuation of Application Ser. No. 10/382,250, filed Mar. 5, 2003, to issue as U.S. Pat. No. 6,960,245, on Nov. 1, 2005. Application Ser. No. 10/382,250 is a continuation of Application Ser. No. 10/077,513, filed Feb. 15, 2002, issued as U.S. Pat. No. 6,533,845 on Mar. 18, 2003. Application Ser. No. 10/077,513 is a continuation of Application Ser. No. 09/437,867, filed Nov. 10, 1999, issued as U.S. Pat. No. 6,348,085 on Feb. 19, 2002. Application Ser. Nos. 10/382,250, 10/077,513, and 09/437,867 are incorporated hereby by reference.

TECHNICAL FIELD

This disclosure describes filter constructions for filtering fluids, such as gas or liquid. In particular, this disclosure describes a filter element, a pre-filter, a housing, and methods particularly useful with gas turbine systems.

BACKGROUND

Gas turbine systems are useful in generating electricity. These types of systems are particularly convenient in that they can be constructed quickly; they are also desirable because they produce fewer harmful emissions than coal or oil based turbine systems. Gas turbines utilize air for combustion purposes. Due to the precision moving parts in these types of systems, the combustion air needs to be clean. To ensure clean air for combustion, air filters have been used to clean the air taken into the gas turbine system. In prior art systems, a series of panel filters have been used to clean intake air. As systems became more sophisticated, cleaner air was required. This caused an increase in cost.

Improvements in cleaning air intake into gas turbine systems is desirable.

SUMMARY OF THE DISCLOSURE

In one aspect, the disclosure describes a filter arrangement. In general, the filter arrangement includes a first filter element having opposite first and second ends; an axial length between the first and second ends; and a plurality of flutes. Each of the flutes has a first end portion adjacent to the first filter element first end, and a second end portion adjacent to the first filter element second end. Selected ones of the flutes are open at the first end portion and closed at the second end portion; and selected ones of the flutes are closed at the first end portion and open at the second end portion. A sleeve member is secured to and circumscribes the first filter element. The sleeve member is oriented relative the first filter element to extend at least 30% of the axial length of the first filter element. A seal member pressure flange at least partially circumscribes the sleeve member.

In another aspect, a filtration system is described including a tube sheet having at least a single through hole; a sleeve member removably and replaceably mounted in the hole; a flange at least partially circumscribing the sleeve member; a seal member compressed between and against the flange and the tube sheet; and a first filter element secured within the sleeve member. The first filter element preferably is a straight flow through system comprising fluted media.

A prefilter element is also described. Preferably, the prefilter element is removably mounted upstream of a primary filter element within a sleeve member. Methods of assembling the prefilter are described.

Systems for using preferred filter arrangements are described. Particularly useful systems include gas turbine systems.

Another aspect includes methods for operating and servicing. Preferred methods include constructions configured according to principles described herein.

BRIEF DESCRIPTION OF THE DRAWINGS

FIG. 1 is a schematic view of one embodiment of an air intake system for a gas turbine system having air filter arrangements constructed according to principles disclosed herein.

DETAILED DESCRIPTION

A. FIG. 1, System of Use

Figure 3:
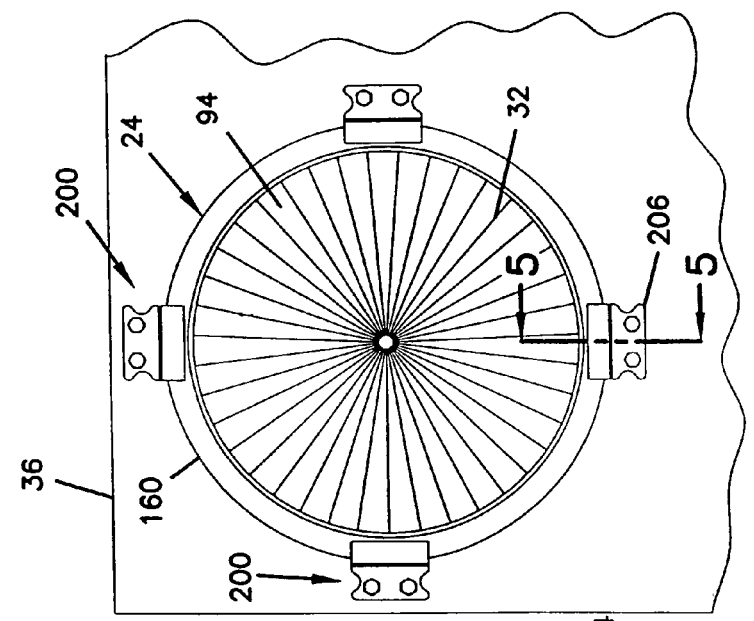
FIG. 3 is a schematic, rear elevational view of the air filter arrangement depicted in FIG. 2, the pre-filter element being visible.

The air cleaner arrangements and constructions disclosed herein are usable in a variety of systems. FIG. 1 depicts one particular system, in this case, a gas turbine system schematically at 20.

In FIG. 1, airflow is shown drawn into an air intake system 22 at arrows 23. The air intake system 22 includes a plurality of air filter arrangements 24 generally held in a tube sheet 36. In preferred systems, the tube sheet 36 will be constructed to hold the filter arrangements 24 at an angle, relative to a vertical axis. Preferred angles will be between 5–25°, for example, about 7°. This permits liquid to drain from the filter arrangements 24 when the system 20 is not operating.

The air is cleaned in the air filter arrangements 24, and then it flows downstream at arrows 26 into gas turbine generator 28, where it is used to generate power.

B. Overview of Air Filter Arrangement

Figure 4:
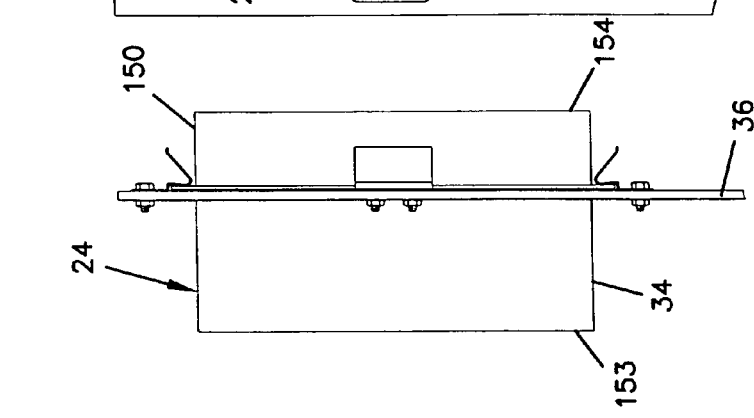
FIG. 4 is a schematic, side elevational view of the air filter arrangement of FIGS. 2 and 3 installed in the tube sheet.
Figure 2:
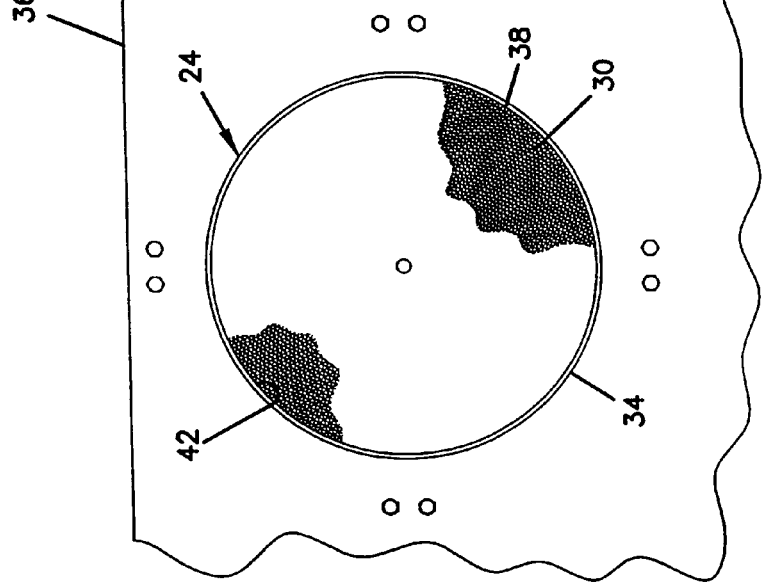
FIG. 2 is a schematic, front elevational view of one embodiment an air filter arrangement installed within a tube sheet, the primary filter element being visible.

One example of an air filter arrangement 24 usable in system 20 is shown in FIGS. 2–4. In general, the air filter arrangement 24 includes a first, or primary filter element 30 and a second filter element 32, which acts as a prefilter. By the term "prefilter", it is meant a separator that is positioned upstream of the main, primary filter element 30, that functions to remove large particles from the gas stream. The primary filter element 30 is viewable in FIG. 2, while the prefilter 32 is viewable in FIG. 3. The primary filter element 30 and the prefilter element 32 are preferably secured within a sleeve member 34 that is removably mountable in an aperture 38 in tube sheet 36. In general, air flow is taken in through the air intake system 22 and flows first through the prefilter element 32 and then through the primary filter element 30. After exiting the primary filter element 30, the air is directed into the generator 28.

C. The Primary Filter Element

Figure 5:
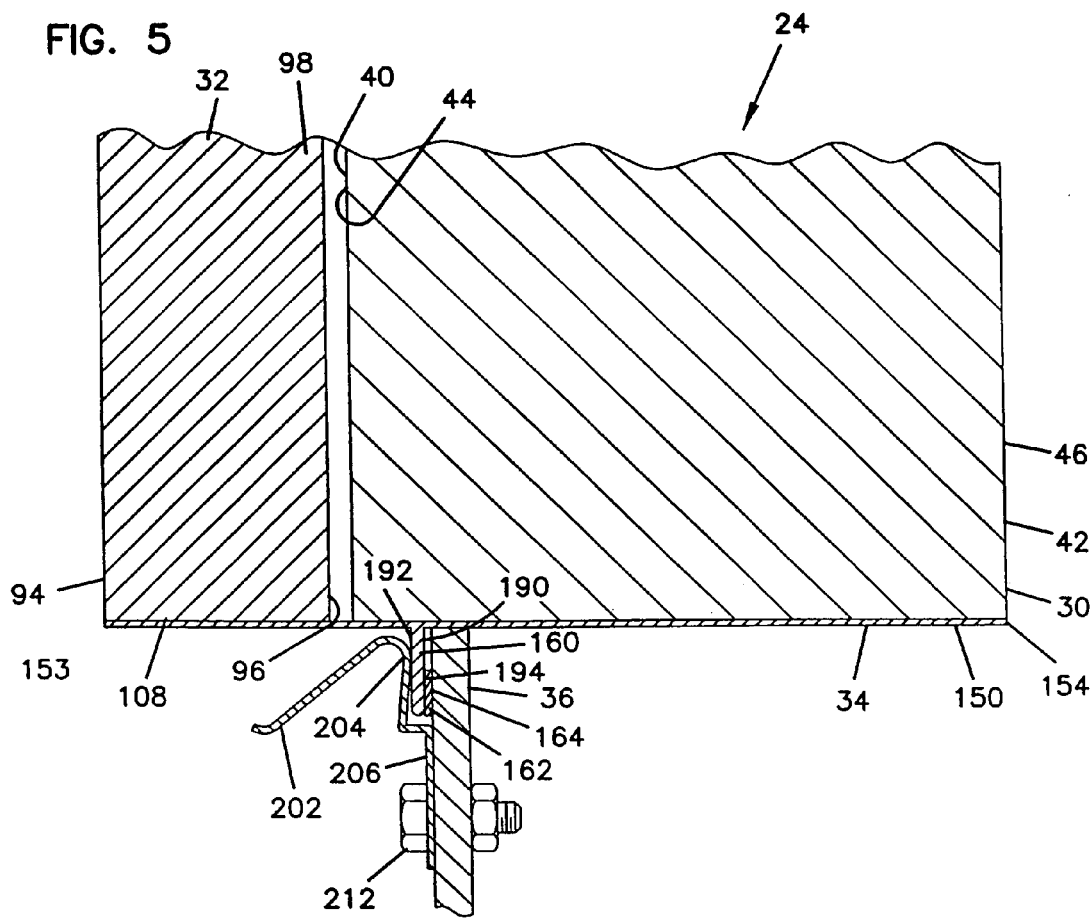
FIG. 5 is a schematic, fragmented, enlarged, cross-sectional view of the air filter arrangement of FIGS. 2–4, taken along the line 5—5 of FIG. 3.
Figure 7:
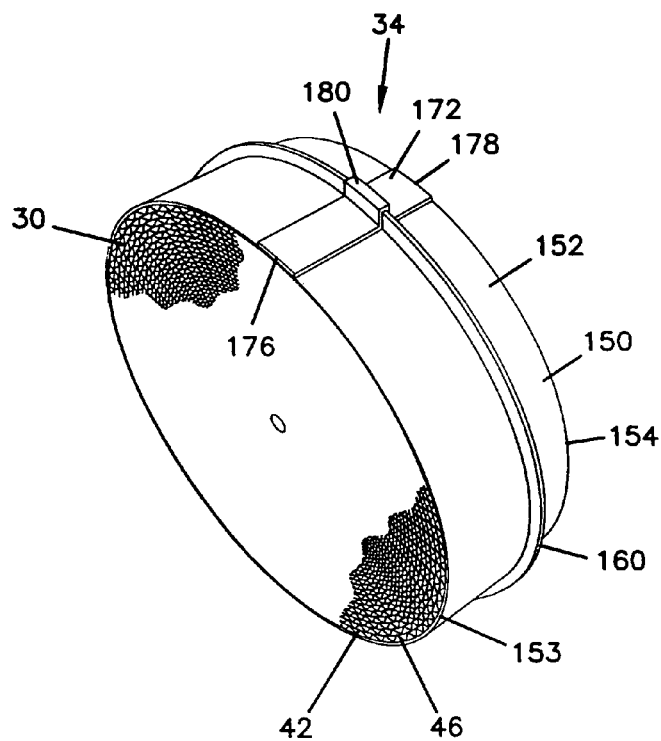
FIG. 7 is a schematic, perspective view of the air filter arrangement of FIGS. 2–4 and removed from the tube sheet, the primary filter element being visible.

In reference now to FIGS. 2, 5, and 7, the primary filter element 30 is configured to permit straight through flow. By the term "straight through flow," it is meant that the fluid flows directly through the filter element 30, entering at an inlet face 40 and exiting at an oppositely disposed outlet face 42, wherein the direction of fluid flow entering the inlet face 40 is in the same direction of fluid flow exiting the outlet face 42. In FIG. 2, it should be understood that the outlet face 42 is shown schematically. That is, only a portion of the face 42 is shown with flutes. It should be understood that, in typical systems, the entire face 42 will be fluted.

The filter element 30 has a first end 44 and an opposite, second end 46. In the arrangement depicted in FIG. 2, the first end 44 will correspond to an upstream end inlet face 40, while the second end 46 will correspond to a downstream end outlet face 42. The straight through flow allows gas to flow into the first end 44 and exit the second end 46, such that the direction of the air flow into the first end 44 is the same direction of air flow that is exiting the second end 46. Straight through flow patterns can reduce the amount of turbulence in the gas flow.

Figure 16:
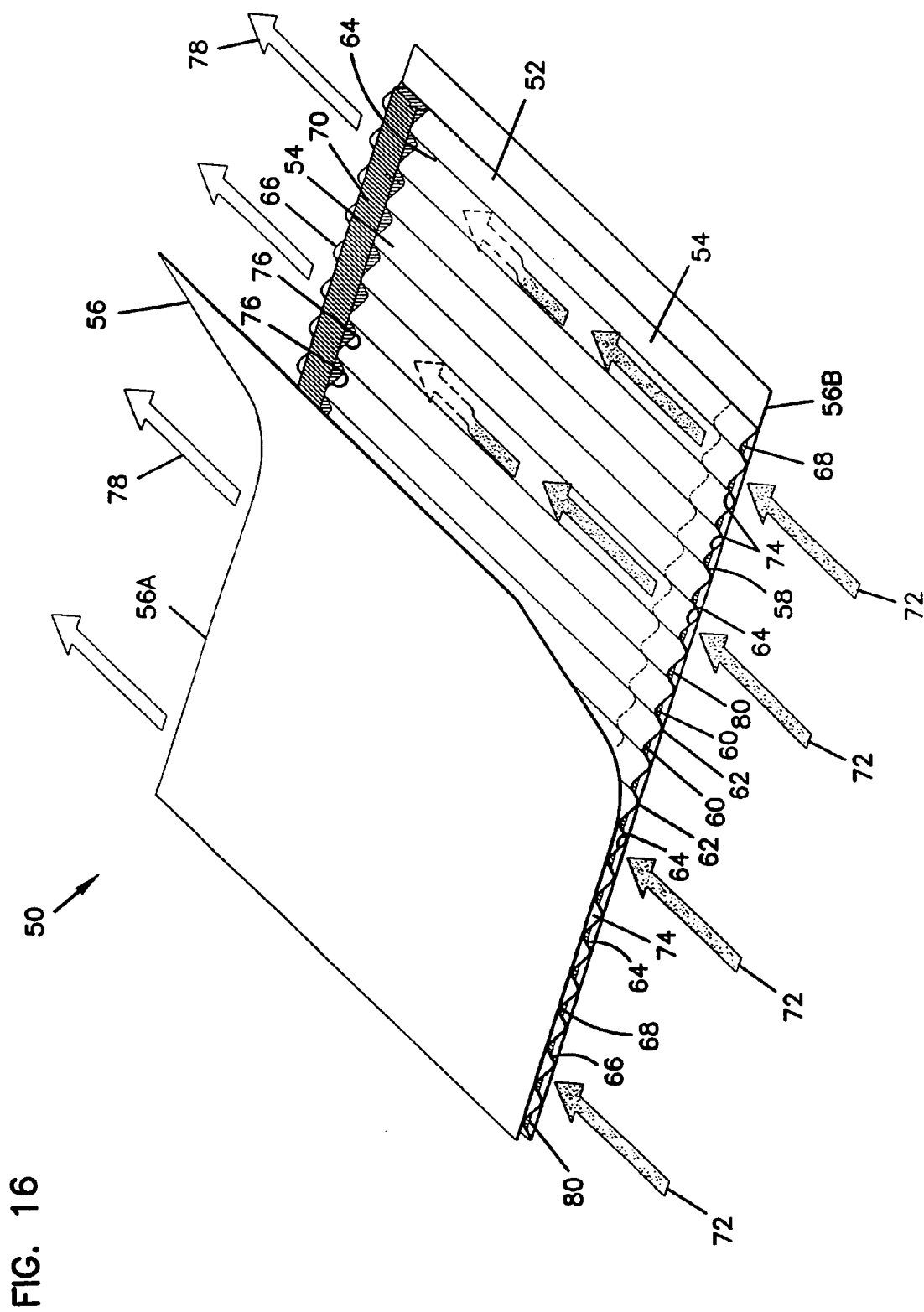
FIG. 16 is a schematic, perspective view of one embodiment of a portion of filter media usable in the primary filter element depicted in FIGS. 2, 7 and 8.

Attention is directed to FIG. 16. FIG. 16 is a schematic, perspective view demonstrating the principles of operation of certain preferred media usable in the primary filter element 30. In FIG. 16, filter media in the form of a fluted construction is generally designated at 50. Preferably, the fluted construction 50 includes: a layer 52 of corrugations having a plurality of flutes 54 and a face sheet 56. The FIG. 16 embodiment shows two sections of the face sheet at 56A (depicted on top of the corrugated layer 52) and at 56B (depicted below the corrugated layer 52). Typically, the preferred fluted construction 50 will include the corrugated layer 52 secured to the bottom face sheet 56B. When using this fluted construction 50 in a rolled construction, it typically will be wound around itself, such that the bottom face sheet 56B will cover the top of the corrugated layer 52. The face sheet 56 covering the top of the corrugated layer 52 is depicted as 56A. It should be understood that the face sheet 56A and 56B are the same sheet 56.

When using this type of fluted construction 50, the flute chambers 58 preferably form alternating peaks 60 and troughs 62. The troughs 62 and peaks 60 divide the flutes into a two rows, one being positioned adjacent to (in FIG. 16 over or on top of) the other row. In the particular configuration shown in FIG. 16, the upper flutes form flute chambers 64 closed at the downstream end, while flute chambers 66 having their upstream ends closed form the lower row of flutes. The fluted chambers 66 are closed by a first end bead 68 that fills a portion of the upstream end of the flute between the fluting sheet 52 and the second facing sheet 56B. Similarly, a second end bead 70 closes the downstream end of alternating flutes 64.

When using media constructed in the form of fluted construction 50, during use, unfiltered fluid, such as air, enters the flute chambers 64 as indicated by the shaded arrows 72. The flute chambers 64 have their upstream ends 74 open. The unfiltered fluid flow is not permitted to pass through the downstream ends 76 of the flute chambers 64 because their downstream ends 76 are closed by the second end bead 70. Therefore, the fluid is forced to proceed through the fluting sheet 52 or face sheet 56. As the unfiltered fluid passes through the fluting sheet 52 or face sheet 56, the fluid is cleaned or filtered. The cleaned fluid is indicated by the unshaded arrow 78. The fluid then passes through the flute chambers 66, which have their upstream ends 80 closed to flow through the open downstream ends out the fluted construction 50. With the configuration shown, the unfiltered fluid can flow through the fluted sheet 52, the upper facing sheet 56A, or the lower facing sheet 56B and into a flute chamber 66.

The fluted construction 50 is typically wound into a rolled or coiled form, such as shown in FIG. 7. A variety of ways can be used to coil or roll the fluted construction 50. The fluted construction 50 may be wrapped around a central core; alternatively, the fluted construction 50 may be coreless. Referring again to FIGS. 2, 7, and 8, note the cross-sectional shape of the filter element 30 is generally circular. The cross-section also could be non-circular, in other embodiments, such as obround or "racetrack shaped." By "obround" or "racetrack shaped," it is meant that a filter element would define a curved (in some embodiments, semicircular) end and an opposite curved (in some embodiments, semicircular) end. The curved ends would be joined by a pair of straight segments.

The media 50 can be a polyester synthetic media, a media made from cellulose, or blends of these types of materials. One example of usable cellulose media is: a basis weight of about 45–55 lbs./3000 ft$^2$ (84.7 g/m$^2$), for example, 48–54 lbs./3000 ft$^2$; a thickness of about 0.005–0.015 in, for example about 0.010 in. (0.25 mm); frazier permeability of about 20–25 ft/min, for example, about 22 ft/min (6.7 m/min); pore size of about 55–65 microns, for example, about 62 microns; wet tensile strength of at least about 7 lbs/in, for example, 8.5 lbs./in (3.9 kg/in); burst strength wet off of the machine of about 15–25 psi, for example, about 23 psi (159 kPa). The cellulose media can be treated with fine fiber, for example, fibers having a size (diameter) of 5 microns or less, and in some instances, submicron. A variety of methods can be utilized for application of the fine fiber to the media, if it is desired to use fine fiber. Some such approaches are characterized, for example, in U.S. Pat. No. 5,423,892, column 32, at lines 48–60. More specifically, such methods are described in U.S. Pat. Nos. 3,878,014; 3,676,242; 3,841,953; and 3,849,241, incorporated herein by reference. An alternative is a trade secret approach comprising a fine polymeric fiber web positioned over conventional media, practiced under trade secret by Donaldson Company under the designation ULTRA-WEB®. With respect to the configurations of the filter element, if it is desired to use fine fiber, there is no particular preference for: how the fine fibers are made; and, what particular method is used to apply the fine fibers. Enough fine fiber typically would be applied until the resulting media construction would have the following properties: initial efficiency of 99.5% average, with no individual test below 90%, tested according to SAE J726C, using SAE fine dust; and an overall efficiency of 99.98% average, according to SAE J726C.

Example of usable filter constructions are described in U.S. Pat. No. 5,820,646, which patent is incorporated by reference herein.

D. The Prefilter Element

Figure 13:
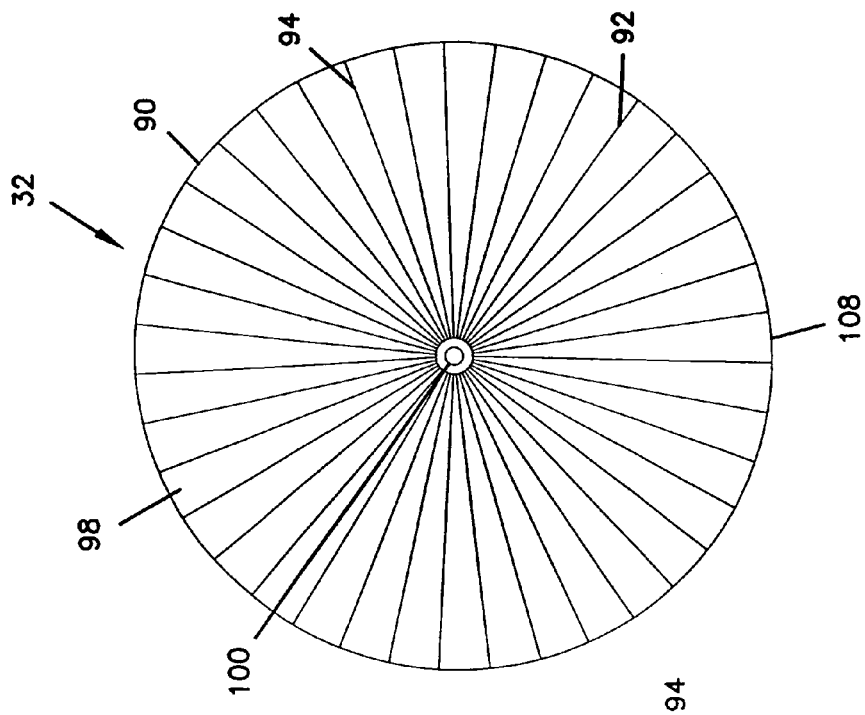
FIG. 13 is a schematic, bottom plan view of the prefilter of FIGS. 11 and 12.
Figure 12:
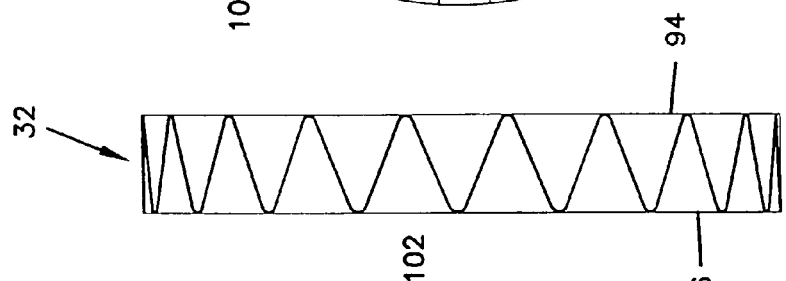
FIG. 12 is a schematic, side elevational view of the prefilter of FIG. 11.
Figure 11:
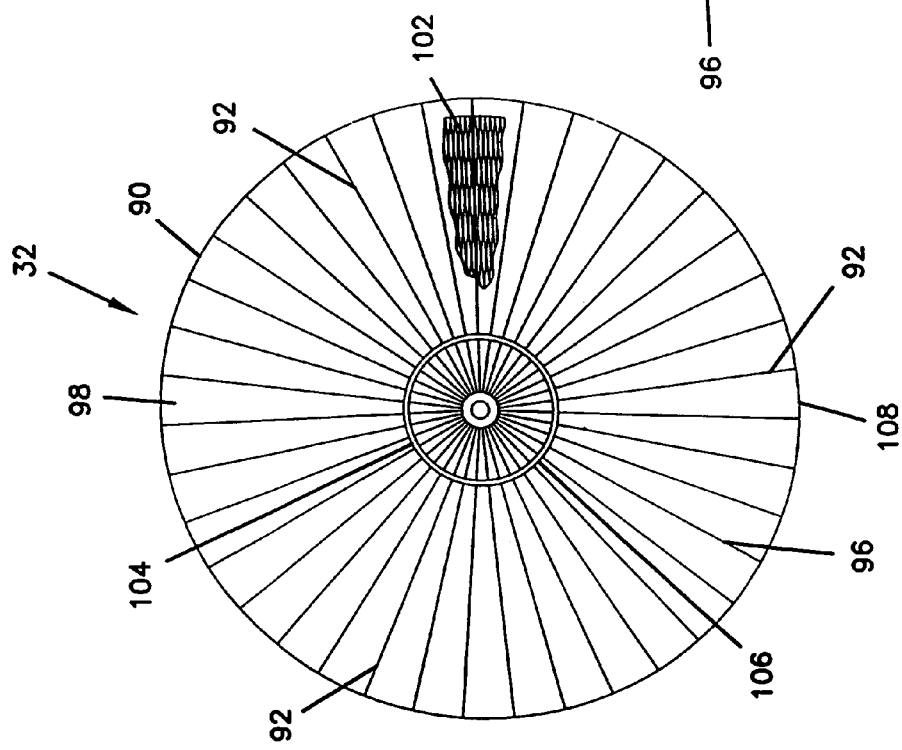
FIG. 11 is a schematic, top plan view of one embodiment of a pre-filter utilized in the air filter arrangements of FIGS. 2–4 and 7–9.

Attention is directed to FIGS. 3 and 11–13. The prefilter element 32 is illustrated. Preferably, the prefilter element 32 is a pleated construction 90 comprising a plurality of individual pleats 92. The pleats 92 are arranged in a zig-zag fashion. As can be seen in FIGS. 3, 11, and 13, preferred prefilter elements 32 will have a generally circular cross-section.

The prefilter element 32 is configured to permit straight through flow. In other words, the air flows directly through the prefilter element 32, entering at an inlet face 94 and exiting at an oppositely disposed outlet face 96, wherein the direction of fluid flow entering the inlet face 94 is in the same direction of fluid flow exiting the outlet face 96.

In certain preferred embodiments, there will be at least 15 pleats 92, no greater than 80 pleats 92, and typically 30–50 pleats 92. The pleated construction 90 is made from a media 98 that is folded in the form of pleats 92 centered around a central core 100. Useable types of media 98 includes fiberglass, or alternatively, an air laid media. Specific properties of usable media 98 include: a dry laid filter medium made from polyester fibers randomly oriented to form a web having a weight of 2.7–3.3 oz./yd$^3$ (92–112 g/m$^3$); a free thickness (i.e., thickness at 0.002 psi compression) of 0.25–0.40 in. (6.4–10.2 mm); and a permeability of at least 400 ft./min (122 m/min).

Preferred prefilter elements 32 will include a filter support or liner 102, at least on the downstream side 96. The filter support or liner 102 can be constructed of an expanded mesh, made from plastic or metal. It should be noted that the liner 102 is illustrated schematically in FIG. 11. FIG. 11 shows the liner 102 only over a certain portion of the outlet face 96. This is to represent that the liner 102 covers the entire outlet face 96. In certain alternative embodiments, the inlet face 94 can also have a filter support or liner.

Still in reference to FIG. 11, in the prefilter element 32 illustrated, there is an adhesive 104 utilized to maintain the prefilter element 32 in the shape of a circular pleated construction 90. In particular, the sealant 104 can be a bead 106 of hot-melt that is applied to the pleated construction 90 after being shaped into a circular configuration. The bead 106 solidifies and helps to hold the pleated construction 90 in its circular configuration.

In general, the prefilter element 32 is removably and replaceably mountable in the sleeve member 34. The sleeve member 34 is described in further detail below. In certain systems, the prefilter element 32 is held within the sleeve member 34 by squeezing or compressing the end tips 108 of the media 98 against the inside wall of the sleeve member 34. In other words, the primary filter element 32 is preferably constructed to have an initial, free-state, outermost dimension (in this case, diameter) that is greater than the inside diameter of the sleeve member 34. When placed inside of the sleeve member 34, the end tips 108 of the media 98 are squeezed, compressed, bent, or smashed between the inside wall of the sleeve member 34 and the end of the liner 102.

Figure 14:
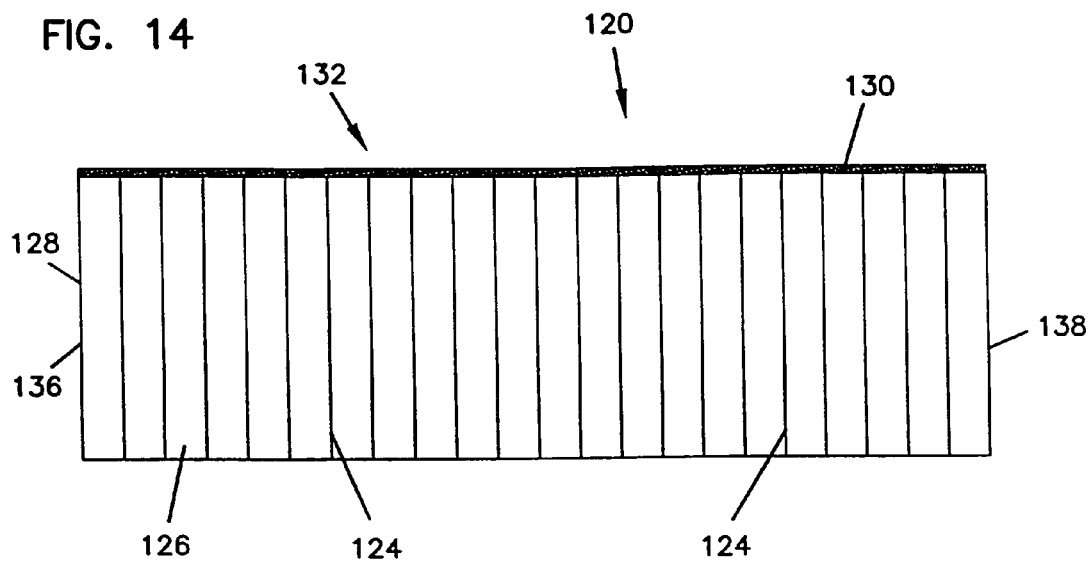
FIG. 14 is a schematic, top plan view of another embodiment of a prefilter utilized in the air filter arrangements of FIGS. 2–4 and 7–9, during assembly.
Figure 15:
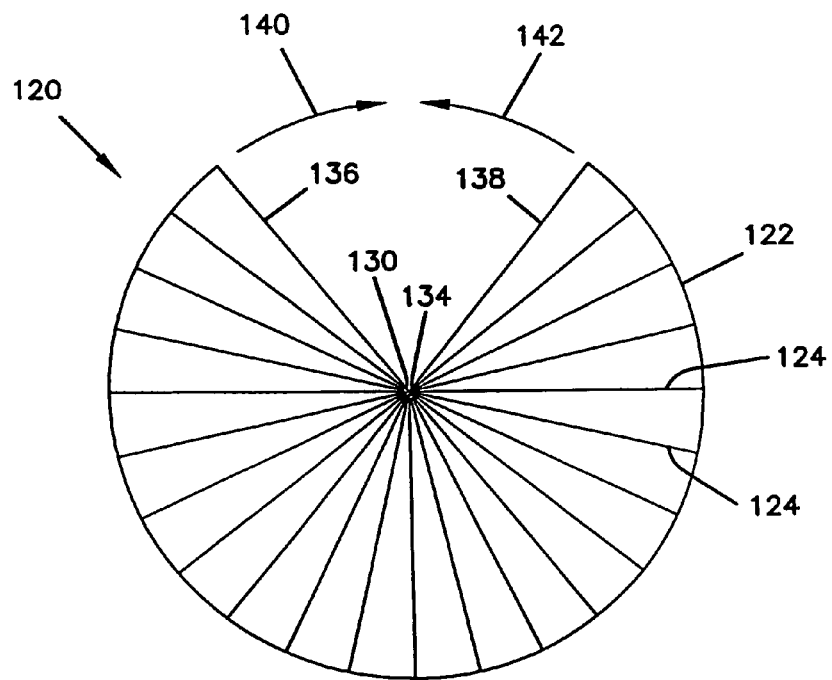
FIG. 15 is a schematic, top plan view of another step of assembling the prefilter of FIG. 14.

An alternative embodiment of a prefilter element is illustrated in FIGS. 14 and 15, generally at 120. The prefilter element 120 is analogous to prefilter element 32, in that it comprises a pleated construction 122 of individual pleats 124. The prefilter element 120 is assembled differently from the prefilter element 32. In this embodiment, the prefilter element 120 is constructed by folding a sheet of media 126 into a series of pleats 124. This forms a generally rectangular sheet 128 of pleated media. The sheet 128 is inserted into a mold containing polyurethane. The polyurethane is cured, to form a solid, rectangular end 130 of compressible polyurethane. This panel 132 can then be assembled into the prefilter element 120.

Attention is directed to FIG. 15. FIG. 15 illustrates the steps of assembling the panel 132 into the prefilter element 120. The end 130 is pinched together to form a core 134. End pleats 136, 138 are then moved toward each other in the direction of arrows 140, 142. In this manner, the pleated panel 132 is fanned to form the circular prefilter element 120. The end pleats 136 and 138 are then joined together with a clip.

The prefilter element 120 is convenient, in that the prefilter element 120 can be stored and shipped to the end user in the form of panel 132. Just before installation, the panel 132 can be fanned out to form the resulting circular prefilter element 120.

E. The Sleeve Member and Clamping System

Preferred filter arrangements 24 constructed according to principles herein will have sleeve member 34 secured to and circumscribing the primary filter element 30.

In general, the sleeve member 34 functions to hold the primary element 30 in place in the air intake system 22. Preferred sleeve members 34 will also hold the prefilter element 32 in place upstream of the primary element 30.

Figure 8:
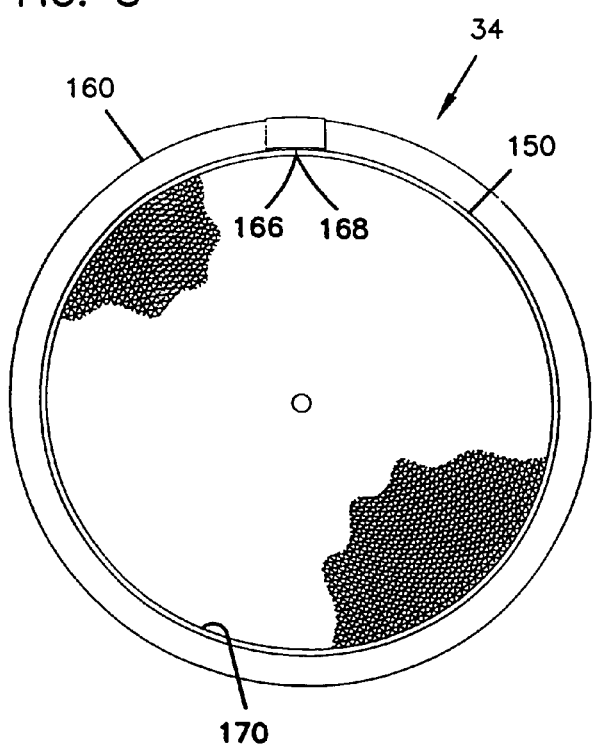
FIG. 8 is a schematic, front elevational view of the air filter arrangement of FIG. 7, the primary filter element being visible.
Figure 9:
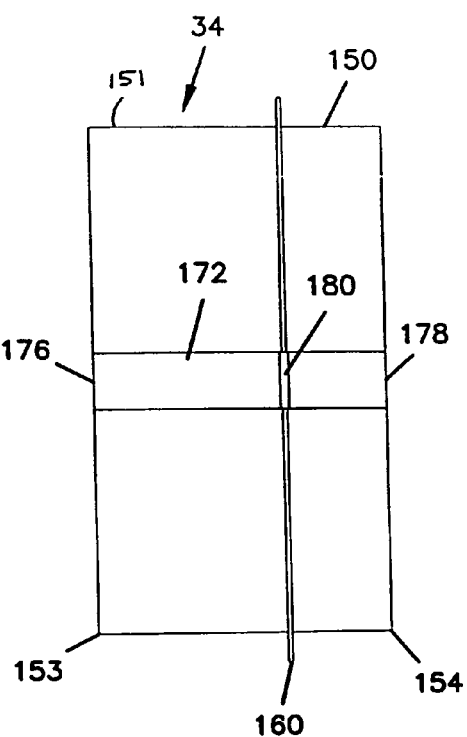
FIG. 9 is a top plan view of the air filter arrangement of FIGS. 7 and 8.

Attention is directed to FIGS. 7–9. One preferred sleeve member 34 is illustrated, holding the primary element 30. As can be seen in FIGS. 7 and 8, the sleeve member 34 preferably has a cross-section that matches the cross-section of the primary filter element. In this case, the primary filter element 30 has a generally circular cross-section therefore, the preferred sleeve member 34 has a generally circular cross-section. It should be understood that in other embodiments, the primary element 30 may have a cross-section of a different shape. In those cases, the sleeve member 34 would have a cross-section that would match the cross-section of the filter element 30.

As can be seen in FIG. 5, the sleeve member 34 includes a surrounding wall 150 that is curved in a form to result in a surrounding ring 152. The wall 150 has a length that generally extends from the end 153 (which, in this case, is even with second end 46 or outlet face 42 of the primary element 30) to an opposite end 154. The sleeve member 34 is preferably oriented relative to the primary filter element 30 to extend at least 30% of the axial length of the primary filter element 30. In many typical arrangements, the sleeve member 34 will extend greater than 50% of the axial length of the primary filter element 30. Indeed, in most preferred arrangements, the sleeve member 34 will extend at least the entire length (that is, 100%) of the axial length of the primary filter element 30. In many typical applications, the sleeve member 34 will have a radius of at least 10 inches, typically 15–30 inches, and in some instances, no greater than 50 inches.

The sleeve member 34 is preferably constructed and arranged with a sealing system to allow for securing the primary filter element 30 to the tube sheet 36, without permitting unintended amounts of air from bypassing the primary element 30. In the arrangement depicted in FIGS. 3, 5, and 7–9, the sleeve member 34 includes a seal member pressure flange 160. The flange 160 at least partially, and in most preferred embodiments, fully circumscribes the wall 150 of the sleeve member 34. Indeed, in most preferred embodiments, the flange 160 is extruded with the wall 150 as a single extrusion 151, and then curved into a shape that matches the cross-sectional configuration of the primary element 30. The seal member pressure flange 160 operates as a backstop to support a seal member 162 in order to create a seal 164 between and against the flange 160 and the tube sheet 36. Preferably, the flange 160 extends radially from the wall 150 of the sleeve member 34 and fully circumscribes the seal member 34. The flange 160 will extend radially from the wall 150 a distance sufficient to support the seal member 162. In general, this distance will be at least 0.1 inches, typically 0.25–2 inches, and in some embodiments may extend no greater than 10 inches.

As mentioned above, preferably, the flange 160 and the remaining portions of the sleeve member 34 are extruded as a single piece of material. In many applications, it is convenient to extrude the sleeve member 34 and flange 160 from plastic, such as high impact polystyrene. After extruding, the wall 150 with extending flange 160 is cut to the desired length. The wall 150 with extending flange 160 is bent into a curved shape in order to support the primary filter element 30. The bending can be accomplished by a cold rolling process. The ends 166, 168 of the extrusion 151 are not, at this stage, joined together.

Figure 10:
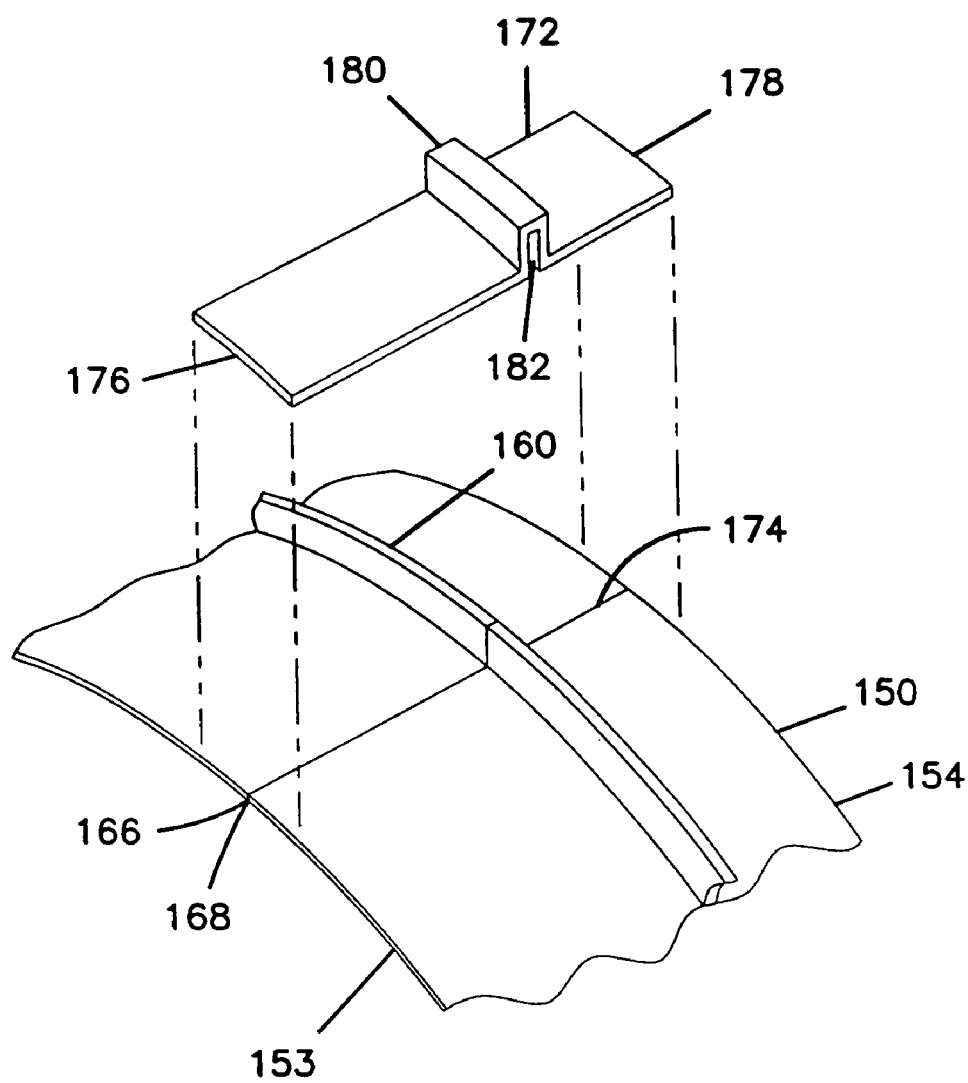
FIG. 10 is a schematic, exploded, enlarged perspective view of a clip and a sleeve for holding the filter elements utilized in the air filter arrangement of FIGS. 2–4 and 7–9.

Attention is directed to FIG. 10. FIG. 10 shows the wall 150 with abutting ends 166, 168. Before the ends 166, 168 of the extrusion 151 are pushed together, the primary filter element 30 is installed within the sleeve member 34. In some applications, the primary element 30 has adhesive applied to its outer wall; alternatively, adhesive is applied along the inner surface of the wall 150; alternatively, adhesive is applied to both the outer surface of the primary element 30 and the inner surface of the wall 150. The primary element 30 is then positioned inside of the aperture 170 formed by the sleeve member 34. A clamping machine then presses the end 166 and the end 168 toward each other in abutting engagement to form joint 174. A patch or retaining clip 172 is then placed over the joint 174 to secure the sleeve member 34 in its final configuration (in the example shown in the FIGS., a generally circular configuration). Preferably, the retaining clip 172 is secured in a permanent way to the sleeve member 34. For example, the retaining clip 172 may be secured to the wall 150 by ultrasonic welding.

Note that the retaining clip 172 is configured to overlap the joint 174 completely between end 153 and end 154. That is, the clip 172 has an end 176 that is generally flush or even with end 153. The clip has an end 178 that is generally flush or even with end 154. The clip 172 also has a protrusion 180 between the ends 176, 178 that overlaps and engages the flange 160. Preferred shapes of the protrusion 180 will be something that defines an inside pocket 182 in the negative shape of the flange 160. In the embodiment illustrated in FIG. 10, the protrusion 180 is U-shaped.

Attention is directed to FIG. 5. It can be seen that the flange 160 includes first and second opposite axial sides 190, 192. One of the axial sides, in this case side 190, supports the seal member 162. The seal member 162 generally comprises a circular gasket 194. The gasket 194 is preferably secured to the flange 160, by adhesive between the gasket 194 and the side 190 of the flange 160. The gasket 194 is positioned on the flange 160, such that the gasket 194 completely circumscribes the wall 150 and the primary element 30.

The arrangement depicted also includes a system for clamping the sleeve member 34 to the tube sheet 36. In the embodiment illustrated in FIGS. 3, 5, and 6, the clamping system includes a plurality of latches or clamps 200. There should be enough latches or clamps 200 to form a good, tight seal 164 between the flange 160 and the tube sheet 36, when the sleeve member 34 is operably installed in the tube sheet 36. In the embodiment shown in FIG. 3, there are 4 clamps 200. Each of the clamps 200 is evenly spaced radially along the periphery of the flange 160. In other embodiments, there can be more than 4 clamps 200 for example, 6–10 clamps. In certain other embodiments, there can be fewer than 4 clamps 200.

Figure 6:
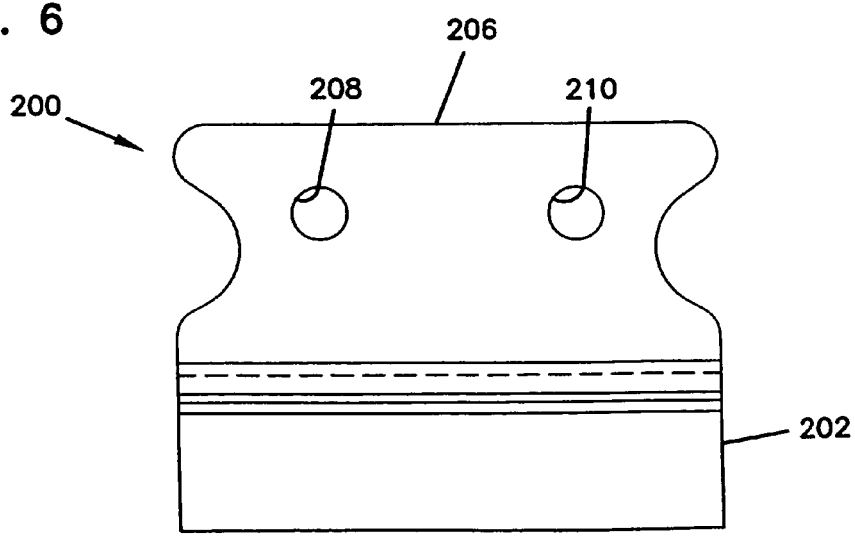
FIG. 6 is a schematic, enlarged, top plan view of one embodiment of a latch utilized to hold the air filter arrangement of FIGS. 2–4 in the tube sheet.

Attention is directed to FIGS. 5 and 6. In FIG. 5, the clamp 200 is shown in cross-section. Each of the clamps 200 includes a lever 202, a nose 204, and a plate 206. The plate 206 includes apertures 208, 210 for accommodating a fastener, such as a bolt 212 to secure the clamp 200 to the tube sheet 36.

The nose 204 operates to apply pressure to the flange 160 and compress the seal member 162 against the tube sheet 36. The lever 202 operates to selectively move the nose 204 toward and away from the tube sheet 36. For example, when installing the filter arrangement 34 in the tube sheet 36, the lever 202 may be depressed by a person's thumb or hand to move the nose 204 in a direction away from the tube sheet 36. This allows the system installer to manipulate the filter arrangement 24 in a way that the flange 160 can be positioned between the nose 204 and the tube sheet 36. In other embodiments, the clamps 200 can be hand-tightened, such as using wing nuts.

F. Methods

In operation, the filter arrangement 24 is used as follows. Air to be filtered in the system 20 is directed at arrows 23 into the intake system 22. The air first flows through the prefilter element 32. The air enters at the inlet face 94, passes through the media 126, and exits through the outlet face 96. The prefilter element 32 removes larger particles and debris from the intake air. Next, the air enters the primary filter element 30. The air enters at the inlet face 40, passes through the fluted construction 50, and exits at the outlet face 42. From there, the air is taken into the generator 28.

In typical operation, there is an overall pressure drop across the filter arrangement 24 of about 0.6–1.6 inches of water. This includes both the primary filter element 30 and the prefilter 32. Typically, the pressure drop across the prefilter 32 alone will be about 0.2–0.6 inches of water, while the pressure drop across the primary element 30 alone will be about 0.4–1 inch of water.

After a period of operation, the filter arrangement 24 should be serviced. It may be that the prefilter element 32, 120 will require more servicing (i.e., removal and replacement) than the primary element 30. To service the prefilter element 32, 120 the prefilter element 32, 120 is grasped at its pleats 92, 124 and removed from the sleeve member 34. This can be done by pulling the prefilter element 32, 120 from frictional engagement with the inner surface of the wall 150. The old prefilter element 32, 120 may then be disposed of. A second, new prefilter element 32, 120 is provided. The prefilter element 120 may be in the form of panel 132; alternatively, the prefilter element 32 may be in the form of the pre-made circular prefilter 32. The panel 132 is manipulated, such that the individual pleats 124 are fanned out, and end pleat 136 is joined to the end pleat 138. Typically, end pleat 136 is then clipped or joined to end pleat 138, to form the circular prefilter element 120. The new prefilter element 32, 120 is then placed inside of the sleeve member 34. This may be done by radially compressing the end tips 108 of the pleated media against the inner surface of the wall 150. This frictional engagement helps to hold prefilter element 32, 120 in place. It should be noted that the pressure of the system 20 also helps to hold the prefilter element 32, 120 in place in the sleeve member 34.

From time to time, the primary element 30 will also require servicing. Typically, this will be after a pressure drop of about 3–4 inches of water. To service the primary element 30, the sleeve member 34 is removed from the tube sheet 36. This is done by breaking the seal 164 between the flange 160 and the tube sheet 36. To break the seal 164, each of the clamps 200 may need to have each of its levers 202 depressed, such that the nose 204 is moved away from the tube sheet 36. The sleeve member 34 is then slid axially from the tube sheet 36 along the aperture 38 defined by the tube sheet 36.

The primary element 30 along with the sleeve member 34 may then be disposed of. Preferably, the primary element and sleeve member 34 are constructed completely of non-metallic materials, such that they can be readily incinerated. Preferably, the primary element 30 and sleeve member 34 are at least 95%, more typically at least 99% non-metallic. Alternatively, the primary element 30 may be removed from the sleeve member 34, and the sleeve member 34 may be reused.

A second, new sleeve member 34 with a new primary element 30 is then provided. The sleeve member 34 holding the primary filter element 30 is axially placed inside of the aperture 38 of the tube sheet 36. Each of the clamps 200 is manipulated by depressing the lever 200 in order to permit the flange 160 to be placed between the nose 204 and the wall of the tube sheet 36. This places the seal member 162 between and against the flange 160 and the tube sheet 36 to create seal 164. A prefilter element 32, 120 may then be installed in the sleeve member 34.

The above specification, examples, and data provide a complete description of the manufacture and use of the invention. Many embodiments of the invention can be made.

We claim:

1. A filter arrangement comprising:
   (a) a first filter element having opposite first and second ends; an axial length between said first and second ends; and a plurality of flutes forming a fluted construction having a central core;
      (i) each of said flutes having a first end portion adjacent to said first filter element first end, and a second end portion adjacent to said first filter element second end;
         (A) selected ones of said flutes being open at said first end portion and closed at said second end portion; and selected ones of said flutes being closed at said first end portion and open at said second end portion;
      (ii) the first filter element having a non-circular cross-section with opposite curved ends joined by segments;
   (b) a sleeve member circumscribing said first filter element;
      (i) said sleeve member having a cross-section sized to receive the first filter element;
      (ii) said sleeve member having a wall with a length that extends greater than 50% of an axial length of the first filter element;
   (c) a seal member pressure flange extending radially from said sleeve member and fully circumscribing said sleeve member;
      (i) said seal member pressure flange including first and second opposite axial surfaces;
      (ii) said seal member pressure flange extending radially from said wall of said sleeve member by a distance of at least 0.1 inch;
      (iii) said seal member pressure flange being curved into a shape; and
   (d) a seal member positioned against the first axial surface of said seal member pressure flange to form a seal between and against the seal member pressure flange and a filtration system, when installed in the filtration system;
      (i) the seal member pressure flange operating as a backstop to support the seal member.

2. A filter arrangement according to claim 1 further including:
   (a) a second filter element adjacent to said first filter element; said second filter element including pleated media.

3. A filter arrangement according to claim 2 wherein:
   (a) said second filter element is circumscribed by said sleeve member.

4. A filter arrangement according to claim 1 wherein:
   (a) said sleeve member includes a surrounding wall extending at least 100% of the axial length of said first filter element.

5. A filter arrangement according to claim 1 wherein:
   (a) said seal member pressure flange extends radially from said wall of said sleeve member by a distance of 0.25–2 inches.

6. A filter arrangement according to claim 1 wherein:
   (a) said seal member comprises a gasket member.

7. A filter arrangement according to claim 1 wherein:
   (a) said seal member pressure flange and said sleeve member are a single, extruded piece.

8. A filter arrangement according to claim 1 wherein:
   (a) the seal member is secured to the seal member pressure flange.

9. A filter arrangement according to claim 8 further including:
   (a) adhesive between the seal member and the seal member pressure flange.

10. A filter arrangement according to claim 1 wherein:
    (a) the first filter element has a racetrack shaped cross-section.

11. A filter arrangement according to claim 1 wherein:
    (a) said seal member pressure flange is curved into a shape to match a cross-sectional configuration of the first filter element.

12. A method of installing a filter arrangement; the method comprising:
    (a) providing a first filter element having opposite first and second ends; an axial length between the first and second ends; and a plurality of flutes forming a fluted construction having a central core;
       (i) each of the flutes having a first end portion adjacent to the first filter element first end, and a second end portion adjacent to the first filter element second end;
          (A) selected ones of the flutes being open at the first end portion and closed at the second end portion; and selected ones of the flutes being closed at the first end portion and open at the second end portion;

(ii) the first filter element having a non-circular cross-section with opposite curved ends joined by segments;
(iii) a sleeve member circumscribing the first filter element;
  (A) the sleeve member having a cross-section sized to receive the first filter element;
  (B) the sleeve member having a wall with a length that extends greater than 50% of an axial length of the first filter element;
(v) a seal member pressure flange extending radially from the sleeve member and fully circumscribing the sleeve member;
  (A) the seal member pressure flange including first arid second opposite axial surfaces;
  (B) the seal member pressure flange extending radially from the wall of the sleeve member by a distance of at least 0.1 inch;
  (C) the seal member pressure flange being curved into a shape; and
(b) forming a seal between and against the seal member pressure flange and a surface in a filtration system by compressing a seal member against the first axial surface of the seal member pressure flange.

13. A method according to claim 12 wherein:
(a) the step of forming a seal includes compressing a seal member that is adhesively secured to the first axial surface of the seal member pressure flange between and against the seal member pressure flange and a surface in a filtration system.

14. A method according to claim 12 wherein:
(a) the step of forming a seal includes forming a seal between and against the seal member pressure flange and a tube sheet.

15. A method according to claim 12 wherein:
(a) the step of providing includes providing a filter element having a racetrack-shaped cross-section.

16. A method according to claim 12 wherein:
(a) the step of providing includes providing a seal member pressure flange curved into a shape to match a cross-sectional configuration of the first filter element.

* * * * *